United States Patent
Hayashi

(10) Patent No.: US 12,278,543 B2
(45) Date of Patent: Apr. 15, 2025

(54) ROTOR FOR ELECTRIC MOTOR

(71) Applicant: TOYOTA JIDOSHA KABUSHIKI KAISHA, Toyota (JP)

(72) Inventor: Kenichiro Hayashi, Ohbu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 18/178,880

(22) Filed: Mar. 6, 2023

(65) Prior Publication Data

US 2023/0291273 A1 Sep. 14, 2023

(30) Foreign Application Priority Data

Mar. 10, 2022 (JP) .................................. 2022-037591

(51) Int. Cl.
  *H02K 7/00* (2006.01)
  *H02K 1/28* (2006.01)

(52) U.S. Cl.
  CPC .............. *H02K 7/003* (2013.01); *H02K 1/28* (2013.01)

(58) Field of Classification Search
  CPC .................................. H02K 7/003; H02K 1/28
  See application file for complete search history.

(56) References Cited

U.S. PATENT DOCUMENTS

| | | | | |
|---|---|---|---|---|
| 9,641,033 B2 * | 5/2017 | Papini | ................. | H02K 1/2766 |
| 2010/0013350 A1 | 1/2010 | Fu | | |
| 2017/0317543 A1* | 11/2017 | Fujii | .................... | H02K 1/2773 |
| 2021/0351645 A1* | 11/2021 | Tanner | .................. | H02K 1/278 |

FOREIGN PATENT DOCUMENTS

| | | | | | |
|---|---|---|---|---|---|
| CN | 111684688 | * | 7/2022 | ............. | H02K 1/276 |
| JP | 2008-187804 A | | 8/2008 | | |
| JP | 2016-123240 A | | 7/2016 | | |
| JP | 2021-027597 A | | 2/2021 | | |

* cited by examiner

*Primary Examiner* — Terrance L Kenerly
(74) *Attorney, Agent, or Firm* — Sughrue Mion, PLLC

(57) ABSTRACT

A rotor including a shaft, and a rotor core fixed on an outer circumferential surface of the shaft, with a key portion provided in an inner circumferential surface of the rotor core being fitted in a keyway provided in the outer circumferential surface of the shaft. The key portion includes an opposed part opposed to the keyway, wherein the opposed part is constituted by a core bottom portion, a core inclined portion and a core curved portion of the inner circumferential surface of the rotor core, which are contiguous in a circumferential direction of the rotor core. The core inclined portion and a shaft inclined portion of the outer circumferential surface of the shaft are in contact at with each other. The core curved portion and a shaft curved portion of the outer circumferential surface of the shaft cooperate to define a clearance in a radial direction of the rotor.

7 Claims, 3 Drawing Sheets

ROTOR FOR ELECTRIC MOTOR

This application claims priority from Japanese Patent Application No. 2022-037591 filed on Mar. 10, 2022, the disclosure of which is herein incorporated by reference in its entirety.

FIELD OF THE INVENTION

The present invention relates to a structure for fixing a rotor core and a shaft to each other, wherein the rotor core and the shaft constitute a rotor for an electric motor.

BACKGROUND OF THE INVENTION

There is proposed a structure for fixing a rotor core and a shaft that constitute a rotor for an electric motor, wherein the shaft includes a V-shaped keyway provided in an outer circumferential surface of the shaft, while the rotor core includes a key portion provided in an inner circumferential surface of the rotor core, such that the key portion of the rotor core is press-fitted in the keyway of the shaft. JP-2016-123240A discloses such a structure.

SUMMARY OF THE INVENTION

By the way, in the structure disclosed in the above-identified Japan Patent Application Publication, the key portion of the rotor core is formed to have a substantially rectangular shape, so that root of the key portion has a curved shape that is sharply changed. Therefore, there is a risk that stress concentration could be caused in vicinity of the root of the key portion during rotation of the rotor.

The present invention was made in view of the background art described above. It is therefore an object of the present invention to provide a rotor for an electric motor, wherein the rotor is capable of suppressing occurrence of stress concentration in a rotor core of the rotor during rotation of the rotor.

The object indicated above is achieved according to the following aspects of the present invention.

According to a first aspect of the invention, there is provided a rotor for an electric motor. The rotor includes: a shaft; and a tubular rotor core fixed on an outer circumferential surface of the shaft. The shaft includes a keyway provided in the outer circumferential surface. The rotor core includes a key portion provided in an inner circumferential surface thereof and fitted in the keyway. The inner circumferential surface of the rotor core includes: (a-1) a core bottom portion defining a top of the key portion; (a-2) a core inclined portion inclined from an end portion of the core bottom portion toward an outer periphery of the rotor core; (a-3) a core inner-circumferential surface portion; and (a-4) a core curved portion connecting between the core inclined portion and the core inner-circumferential surface portion, such that the core bottom portion, the core inclined portion and the core curved portion are contiguous in a circumferential direction of the rotor core and constitute an opposed part of the key portion opposed to the keyway. The outer circumferential surface of the shaft includes: (b-1) a shaft bottom portion defining a groove bottom of the keyway; (b-2) a shaft inclined portion inclined from an end portion of the shaft bottom portion toward the outer periphery of the rotor core; (b-3) a shaft outer-circumferential surface portion; and (b-4) a shaft curved portion connecting between the shaft inclined portion and the shaft outer-circumferential surface portion, such that the shaft bottom portion, the shaft inclined portion and the shaft curved portion are contiguous in a circumferential direction of the shaft and constitute an opposed part of the keyway opposed to the key portion. The core inclined portion of the inner circumferential surface of the rotor core and the shaft inclined portion of the outer circumferential surface of the shaft are in contact at with each other. The core curved portion of the inner circumferential surface of the rotor core and the shaft curved portion of the outer circumferential surface of the shaft cooperate to define a clearance therebetween in a radial direction of the rotor. Each of the core inner-circumferential surface portion of the inner circumferential surface of the rotor core and the shaft outer-circumferential surface portion of the outer circumferential surface of the shaft is defined, for example, by an arc having a curvature center that lies at a rotation axis of the rotor.

According to a second aspect of the invention, in the rotor according to the first aspect of the invention, the core inclined portion of the inner circumferential surface of the rotor core and the shaft inclined portion of the outer circumferential surface of the shaft are in contact at a contact portion with each other, wherein the inner circumferential surface of the rotor core from the contact portion to the core inner-circumferential surface portion, is defined by a plurality of curved lines having respective different curvature radii and contiguous to each other, in a cross section perpendicular to a rotation axis of the rotor.

According to a third aspect of the invention, in the rotor according to the first or second aspect of the invention, the clearance is not larger than 0.5 mm in the radial direction of the rotor.

According to a fourth aspect of the invention, in the rotor according to any one of the first through third aspects of the invention, the core inclined portion of the inner circumferential surface of the rotor core and the shaft inclined portion of the outer circumferential surface of the shaft are in contact at a contact portion with each other, wherein the key portion of the rotor core has a pair of inclined sides that are defined by respective core inclined portions each being the core inclined portion, and wherein a pair of tangents, each tangent to the core inclined portion and passing through the contact portion, intersect with each other and define therebetween an intersection angle that is not smaller than 30 degrees and is smaller than 180 degrees.

According to a fifth aspect of the invention, in the rotor according to any one of the first through fourth aspects of the invention, there are provided two fitting portions each constituted by the keyway and the key portion that is fitted in the keyway, wherein the two fitting portions are located in respective positions that are opposite to each other with respect to a rotation axis of the rotor.

According to a sixth aspect of the invention, in the rotor according to any one of the first through fifth aspects of the invention, the shaft outer-circumferential surface portion of the shaft is press-fitted in the core inner-circumferential surface portion of the rotor core.

In the rotor according to the first aspect of the invention, the core bottom portion, the core inclined portion and the core curved portion are contiguous in the circumferential direction and constitute the opposed part of the key portion opposed to the keyway, and the core curved portion and the shaft curved portion cooperate to define the clearance therebetween in the radial direction. Thus, the inner circumferential surface of the rotor core between a contact portion (at which the core inclined portion is in contact with the shaft inclined portion) and the core inner-circumferential surface portion can be defined by a gentle curved line or lines.

Therefore, even when a high stress is applied to the core curved portion, the applied stress can be distributed substantially equally or evenly over the inner circumferential surface of the rotor core between the contact portion and the core inner-circumferential surface portion, thereby making it possible to suppress occurrence of stress concentration in the rotor core.

In the rotor according to the second aspect of the invention, the inner circumferential surface of the rotor core from the contact portion to the core inner-circumferential surface portion, is defined by the plurality of curved lines having the respective different curvature radii and contiguous to each other, so that the inner circumferential surface of the rotor core between the contact portion and the core inner-circumferential surface portion can be formed to have a gentle curved shape. Therefore, during rotation of the rotor, the stress applied to the core curved portion can be distributed substantially equally or evenly over the core curved portion, thereby making it possible to suppress occurrence of the stress concentration in the rotor core.

In the rotor according to the third aspect of the invention, the clearance is not larger than 0.5 mm in the radial direction of the rotor. Therefore, the inner circumferential surface of the core curved portion can be formed to have a gentle curved shape.

In the rotor according to the fourth aspect of the invention, the pair of tangents, each tangent to the core inclined portion and passing through the contact portion, intersect with each other and define therebetween the intersection angle that is not smaller than 30 degrees and is smaller than 180 degrees. Therefore, the core inclined portion and the core curved portion can be connected through a gentle curved line or lines.

In the rotor according to the fifth aspect of the invention, the two fitting portions are located in respective positions that are opposite to each other with respect to the rotation axis of the rotor. Therefore, it is possible to suppress offset of a center of gravity of the rotor from the rotation axis of the rotor and to suppress runout of the rotor during rotation of the rotor.

In the rotor according to the sixth aspect of the invention, the shaft outer-circumferential surface portion of the shaft is press-fitted in the core inner-circumferential surface portion of the rotor core, the core inner-circumferential surface portion is forced to expand outwardly in the radial direction and a tensile stress is applied to the core curved portion such that the core curved portion is pulled by the generated tensile stress toward the core inner-circumferential surface portion. Since the inner circumferential surface of the core curved portion is defined by a gentle line or lines, the stress applied to the core curved portion can be distributed substantially equally or evenly over the core curved portion.

DETAILED DESCRIPTION OF PREFERRED EMBODIMENT

There will be described embodiment of the present invention in details with reference to drawings. It is noted that figures of the drawings are simplified or deformed as needed, and each portion is not necessarily precisely depicted in terms of dimension ratio, shape, angle, etc, for easier understanding of the embodiment.

Embodiment

Figure 1:
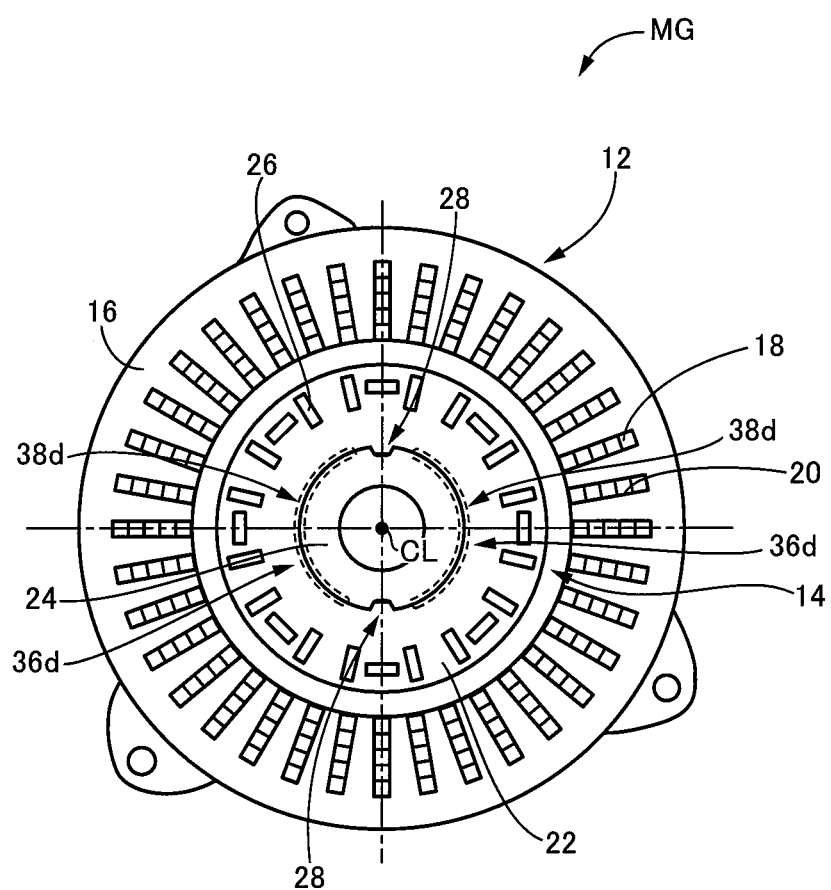
FIG. 1 is a view of an electric motor to which the present invention is applied, as seen from a direction of a rotation axis of the electric motor.

FIG. 1 is a view of an electric motor MG to which the present invention is applied, as seen from a direction of a rotation axis CL of the electric motor MG. The electric motor MG is used as a drive power source for driving a vehicle, for example. The electric motor MG, whose center corresponds to the rotation axis CL, is to be disposed in a casing (not shown).

The electric motor MG includes a stator 12 that is fixed to the casing through bolts or the like, and a rotor 14 disposed on an inner peripheral side of the stator 12.

The stator 12 includes a stator core 16 formed to have a tubular shape and stator coils 18 extending through the stator core 16 in the direction of the rotation axis CL. The stator core 16 is constituted by a plurality of insulated electromagnetic steel plates that are laminated in the direction of the rotation axis CL. The stator core 16 has a plurality of slots 20 that are spaces extending outwardly from an inner circumferential surface of the stator core 16 in a radial direction of the stator core 16. The slots 20 are arranged at equal angular intervals in a circumferential direction of the stator core 16. The plurality of stator coils 18 are provided to pass through each of the slots 20 in the direction of the rotation axis CL. The stator coils 18, each having a rectangular cross-sectional shape, are arranged in the radial direction within each of the slots 20.

The rotor 14 includes a rotor shaft 24 and a tubular rotor core 22 fixed on an outer circumferential surface of the rotor shaft 24. The rotor core 22 and the rotor shaft 24 are fixed integrally to each other, and are rotatable about the rotation axis CL. It is noted that the rotor shaft 24 corresponds to "shaft" recited in the appended claims.

The rotor core 22 is constituted by a plurality of insulated electromagnetic steel plates that are laminated in the direction of the rotation axis CL. A plurality of magnets 26 are provided in the rotor core 22. The rotor shaft 24 is rotatably supported by bearings (not shown) that are provided on its end portions that are opposite to each other in the direction of the rotation axis CL.

The rotor 14 includes two key fitting portions 28 disposed between the rotor core 22 and the rotor shaft 24 in a radial direction of the rotor 14. Each of the two key fitting portions 28 is constituted by a keyway 32 of the rotor shaft 24 and a key portion 34 of the rotor core 22 that is fitted in the keyway 32. The two key fitting portions 28 are located in respective positions that are opposite to each other with respect to the rotation axis CL, namely, that are symmetrical with each other with respect to the rotation axis CL. Owing to provision of the two key fitting portions 28, the rotor core 22 and the rotor shaft 24 are inhibited from being rotated relative to each other. Further, with the two key fitting portions 28 being located in the respective positions that are opposite to each other with respect to the rotation axis CL, it is possible to suppress offset of a center of gravity of the rotor 14 from the rotation axis CL and to suppress runout of the rotor 14 during rotation of the rotor 14.

Figure 2:
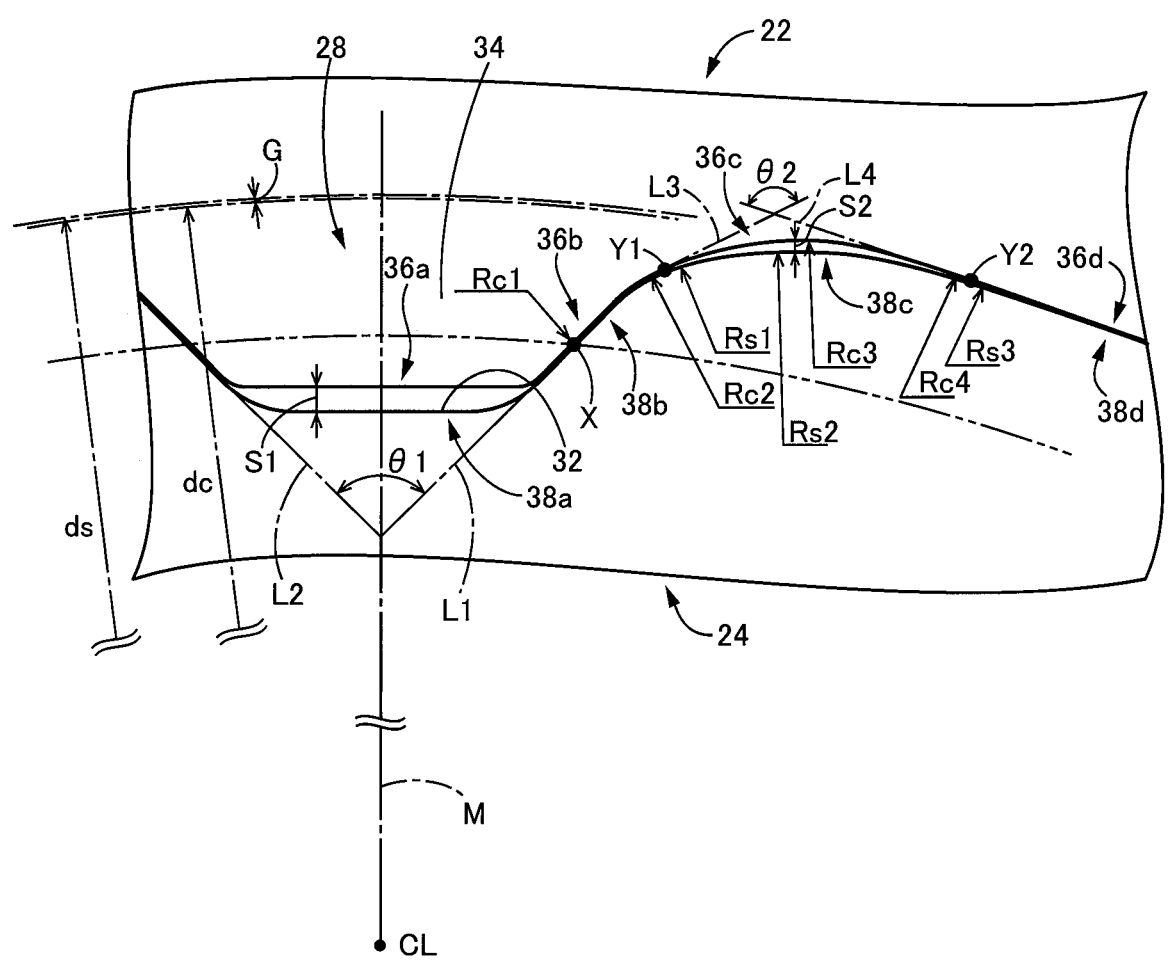
FIG. 2 is a partial view of FIG. 1, showing a fitting portion of the rotor in enlargement.

FIG. 2 is a partial view of FIG. 1, showing one of the two key fitting portions 28 in enlargement. Since the two key fitting portions 28 are identical in construction with each other, description of the other of the two key fitting portions 28 is omitted. Each of the two key fitting portions 28 corresponds to "fitting portion" recited in the appended claims.

Each of the two key fitting portions 28 is constituted by the keyway 32 provided in the outer circumferential surface of the rotor shaft 24 and the key portion 34 provided in the inner circumferential surface of the rotor core 22.

The key portion 34 projects inwardly from the inner circumferential surface of the rotor core 22 in the radial direction of the rotor 14, and is continuously elongated in parallel to the rotation axis CL. The key portion 34 is formed to have a generally trapezoidal shape as seen from the direction of the rotation axis CL. Meanwhile, the keyway 32 is recessed from the outer circumferential surface inwardly in the radial direction of the rotor 14, and is continuously elongated in parallel to the rotation axis CL. The keyway 32 is formed to have a generally V shape as seen from the direction of the rotation axis CL. In an assembled state of the rotor 14, the rotor core 22 and the rotor shaft 24 are inhibited from being rotated relative to each other, with the key portion 34 being fitted in the keyway 32.

The inner circumferential surface of the rotor core 22 includes a core bottom portion 36a, a core inclined portion 36b, a core curved portion 36c and a core inner-circumferential surface portion 36d.

The core bottom portion 36a defines a top of the key portion 34 that is formed to have the trapezoidal shape as seen from the direction of the rotation axis CL.

The core inclined portion 36b is connected to an end portion of the core bottom portion 36a, and is inclined from the end portion of the core bottom portion 36a toward an outer periphery of the rotor core 22. The core inclined portion 36b defines an inclined side of the key portion 34 that is formed to have the trapezoidal shape as seen from the direction of the rotation axis CL. Two core inclined portions 36b (each corresponding to the above-described core inclined portion 36b) are provided for the key portion 34 of each of the two key fitting portions 28. The core inclined portion 36b is defined exclusively by a curved line having a curvature radius Rc1. A connection portion between the core bottom portion 36a and the core inclined portion 36b has a curved shape that enables end portions of the respective core bottom portion 36a and core inclined portion 36b to be continuously and smoothly connected to each other. It is noted that the core inclined portion 36b may be defined also by a straight line, or may be defined not only by the single curved line having the curvature radius Rc1 but also by a plurality of curved lines having respective different curvature radii.

The core curved portion 36c is provided in a position connecting the core inclined portion 36b and the core inner-circumferential surface portion 36d. The core curved portion 36c defines a root of the key portion 34, and has an arc shape recessed toward the outer periphery of the rotor core 22. The core curved portion 36c is defined exclusively by a curved line having a curvature radius Rc3. A connection portion between the core inclined portion 36b and the core curved portion 36c is defined by a curved line having a curvature radius Rc2, for example, such that the core inclined portion 36b and the core curved portion 36c are continuously and smoothly connected to each other. It is noted that the core curved portion 36c may be defined not only by the single curved line having the curvature radius Rc3 but also by a plurality of curved lines having respective different curvature radii.

The core inner-circumferential surface portion 36d constitutes a major portion of the inner circumferential surface of the rotor core 22, and is press-fitted on a shaft outer-circumferential surface portion 38d of the rotor shaft 24 in an assembled state in which the rotor core 22 is fixed on the rotor shaft 24. The core inner-circumferential surface portion 36d is defined by an arc having a curvature center that lies at the rotation axis CL, and a core inside diameter dc that is the largest diameter among portions constituting the inner circumferential surface of the rotor core 22 in a pre-assembled state before the rotor core 22 is fixed on the rotor shaft 24. The core inside diameter dc of the core inner-circumferential surface portion 36d is represented by one-dot chain line in FIG. 2. A connection portion between the core curved portion 36c and the core inner-circumferential surface portion 36d is defined by a curved line having a curvature radius Rc4, for example, such that the core curved portion 36c and the core inner-circumferential surface portion 36d are continuously and smoothly connected to each other.

The core bottom portion 36a, the core inclined portion 36b and the core curved portion 36c are contiguous in a circumferential direction of the rotor core 22, and cooperate to constitute an opposed part of the key portion 34 which is opposed to the keyway 32. The key portion 34 has a shape that is symmetrical with respect to a center line in the circumferential direction, so that the key portion 34 can be conceptually divided by the center line into two parts that are symmetrical to each other in the circumferential direction. In FIG. 2, only one of the two parts of the key portion 34 is shown, while the other of the two parts is not shown.

The outer circumferential surface of the rotor shaft 24 includes a shaft bottom portion 38a, a shaft inclined portion 38b, a shaft curved portion 38c and the above-described shaft outer-circumferential surface portion 38d.

The shaft bottom portion 38a defines a groove bottom of the keyway 32 that is formed to have the V shape as seen from the direction of the rotation axis CL.

The shaft inclined portion 38b defines an inclined side of the keyway 32 having the V shape in its cross section, and is inclined from an end portion of the shaft bottom portion 38a toward the outer periphery of the rotor core 22. The shaft inclined portion 38b is defined by a straight line. A connection portion between the shaft bottom portion 38a and the shaft inclined portion 38b has a curved shape that enables end portions of the respective shaft bottom portion 38a and shaft inclined portion 38b to be continuously and smoothly connected to each other.

Since the keyway 32 of each of the two key fitting portions 28 has the V shape in its cross section, two shaft inclined portions 38b (each corresponding to the above-described shaft inclined portion 38b) are provided for the keyway 32, wherein the two shaft inclined portions 38b are opposite to each other in the circumferential direction. As shown in FIG. 2, straight lines L1, L2, which are extensions of the respective straight lines defining the respective two shaft inclined portions 38b, intersect with each other to define therebetween a first intersection angle θ1, which preferably is not smaller than 30 degrees and is smaller than 180 degrees, and which is 90 degrees in the present embodiment. It is noted that the first intersection angle θ1 corresponds to "intersection angle" recited in the appended claims.

The shaft curved portion 38c is provided in a position connecting the shaft inclined portion 38b and the shaft outer-circumferential surface portion 38d. The shaft curved portion 38c defines vicinity of an exit of the keyway 32, i.e., a widthwise end portion of the keyway 32, and has an arc shape bulging toward the outer periphery of the rotor core 22. The shaft curved portion 38c is defined exclusively by a curved line having a curvature radius Rs2. A connection portion between the shaft inclined portion 38b and the shaft curved portion 38c is defined by a curved line having a curvature radius Rs1, for example, such that the shaft inclined portion 38b and the shaft curved portion 38c are continuously and smoothly connected to each other. It is noted that the shaft curved portion 38c may be defined not only by the single curved line having the curvature radius Rs2 but also by a plurality of curved lines having respective different curvature radii.

The shaft outer-circumferential surface portion 38d constitutes a major portion of the outer circumferential surface of the rotor shaft 24, and is press-fitted in the core inner-circumferential surface portion 36d of the rotor core 22 in the assembled state in which the rotor core 22 is fixed on the rotor shaft 24. The shaft outer-circumferential surface portion 38d is defined by an arc having a curvature center that lies at the rotation axis CL, and a shaft outside diameter ds that is the largest diameter among portions constituting the outer circumferential surface of the rotor shaft 24 in the pre-assembled state before the rotor core 22 is fixed on the rotor shaft 24. The shaft outside diameter ds of the shaft outer-circumferential surface portion 38d is represented by one-dot chain line in FIG. 2. A connection portion between the shaft curved portion 38c and the shaft outer-circumferential surface portion 38d is defined by a curved line having a curvature radius Rs3, for example, such that the shaft curved portion 38c and the shaft outer-circumferential surface portion 38d are continuously and smoothly connected to each other.

The shaft bottom portion 38a, the shaft inclined portion 38b and the shaft curved portion 38c are contiguous in a circumferential direction of the rotor shaft 24, and cooperate to constitute an opposed part of the keyway 32 which is opposed to the key portion 34.

The rotor core 22 and the rotor shaft 24 are fixed integrally to each other, with the shaft outer-circumferential surface portion 38d of the rotor shaft 24 being press-fitted in the core inner-circumferential surface portion 36d of the rotor core 22. In the pre-assembled state, the shaft outside diameter ds of the shaft outer-circumferential surface portion 38d of the rotor shaft 24 is slightly larger than the core inside diameter dc of the core inner-circumferential surface portion 36d of the rotor core 22, so that an interference-fit amount G is defined between the core inner-circumferential surface portion 36d and the shaft outer-circumferential surface portion 38d. The interference-fit amount G, which is defined between the core inner-circumferential surface portion 36d and the shaft outer-circumferential surface portion 38d, is provided in parts surrounded by broken lines in FIG. 1.

In each of the two key fitting portions 28, a clearance S1 is defined between the core bottom portion 36a and the shaft bottom portion 38a in the radial direction of the rotor 14, and the core inclined portion 36b and the shaft inclined portion 38b are in contact with each other. The core inclined portion 36b is defined by the curve line having the curvature radius Rc1, while the shaft inclined portion 38b is defined by the straight line. Therefore, microscopically, the core inclined portion 36b is in point-contact with the shaft inclined portion 38b at a contact point X which lies on the straight line defining the shaft inclined portion 38b and which is located on an inner side of the core inner-circumferential surface portion 36d (having the core inside diameter dc) in the radial direction. It is noted that the core inclined portion 36b and the shaft inclined portion 38b may be fitted with each other through any one of clearance fit, interference fit and transition fit. In case of the interference fit or transition fit, the core inclined portion 36b and the shaft inclined portion 38b are in line contact with each other at a contact portion which is deformed and which includes the above-described contact point X. It is noted that the contact point X corresponds to "contact portion (at which the core inclined portion and the shaft inclined portion are in contact with each other)" that is recited in the appended claims.

As described above, in the rotor core 22, the inner circumferential surface at least from the contact point X of the core inclined portion 36b to the core inner-circumferential surface portion 36d is defined by the above-described curved lines having the respective different curvature radii Rc (e.g., Rc1-Rc4) and contiguous to one another. In other words, the curved line defining an inner peripheral shape of the rotor core 22 has the curvature radius Rc that is changed in steps, from the contact point X of the core inclined portion 36b to the core inner-circumferential surface portion 36d.

Further, in each of the two key fitting portions 28, a clearance S2 is defined between the core curved portion 36c and the shaft curved portion 38c in the radial direction of the rotor 14. The clearance S2 is not larger than 0.5 mm in the radial direction. The curvature radius Rc3 of the curved line defining an inner peripheral shape of the core curved portion 36c and the curvature radius Rs2 of the curved line defining an outer peripheral shape of the shaft curved portion 38c are set to respective values that enables the clearance S2 to be provided. In the present embodiment, for providing the clearance S2, the curvature radius Rc3 of the curved line of the core curved portion 36c is smaller than the curvature radius Rs2 of the curved line of the shaft curved portion 38c (Rs2>Rc3). Owing to provision of the clearance S2, it is possible to increase a degree of freedom in the inner peripheral shape of the core curved portion 36c and to make the inner peripheral shape of the core curved portion 36c be a gentle shape. Further, with a maximum value of the clearance S2 being 0.5 mm, the core curved portion 36c can be defined by a gentle curved line, without being largely recessed toward the outer periphery of the rotor core 22.

As shown in FIG. 2, the core curved portion 36c and the core inclined portion 36b are connected at a connection point Y1, and the core curved portion 36c and the core inner-circumferential surface portion 36d are connected at a connection point Y2. The core curved portion 36c is shaped such that tangents L3, L4 intersect with each other and define therebetween a second intersection angle θ2 that is an obtuse angle, wherein the tangent L3 is tangent to the core curved portion 36c and passes through the connection point Y1, while the tangent L4 is tangent to the core curved portion 36c and passes through the connection point Y2. With the second intersection angle θ2 being the obtuse angle, the inner peripheral shape of the core curved portion 36c is defined by a gentle curved line or lines. Therefore, even when a high stress is applied to the core curved portion 36c, the applied stress is distributed substantially equally or evenly over the core curved portion 36c, thereby making it possible to suppress occurrence of stress concentration in the rotor core 22.

Figure 3:
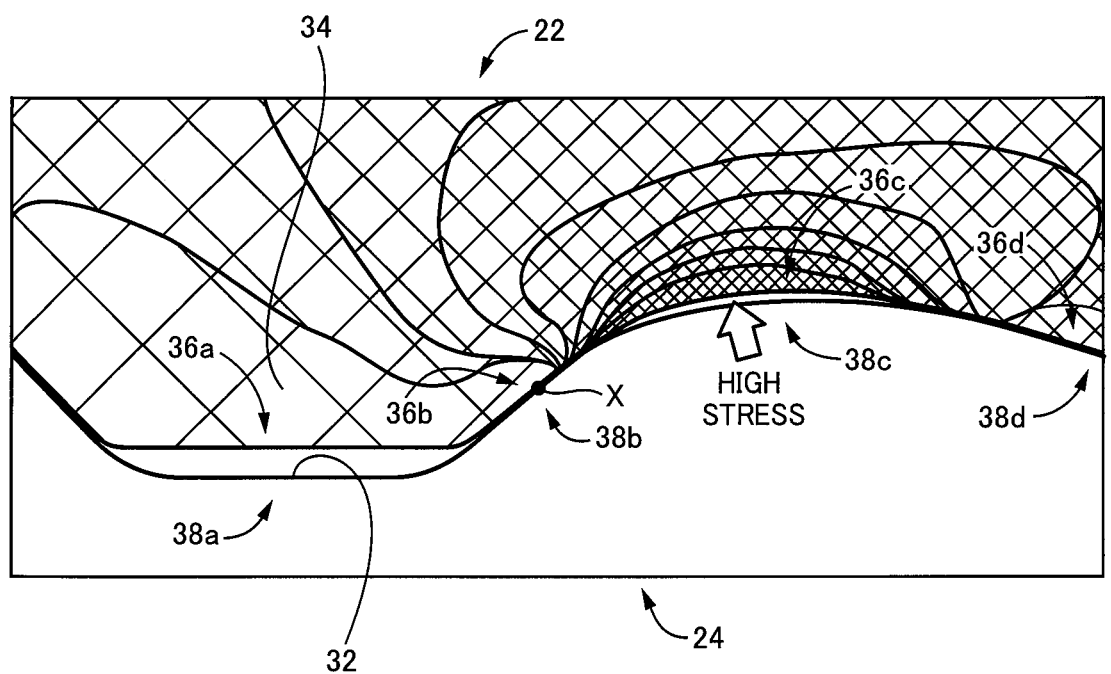
FIG. 3 is a view showing distribution of stress acting around a key portion of a rotor core of the rotor during rotation of the rotor.

FIG. 3 is a view showing result of analysis of distribution of stress acting around the key portion 34 of the rotor core 22 of the rotor 14 during rotation of the rotor 14, wherein the analysis was made through a numerical simulation. In FIG. 3, a hatched portion located in an upper portion of the drawing sheet corresponds to the rotor core 22, while a portion located in a lower portion of the drawing sheet corresponds to the rotor shaft 24.

FIG. 3 shows the rotor core 22 in which a stress applied to each portion is increased as spacing of oblique lines in the portion is finer. As shown in FIG. 3, the stress is increased generally in a direction toward an inner peripheral side of the core curved portion 36c of the rotor core 22, and is maximized in an inner circumferential surface of the core curved portion 36c. In the rotor 14, the interference-fit amount G is provided between the core inner-circumferential surface portion 36d of the rotor core 22 and the shaft outer-circumferential surface portion 38d of the rotor shaft 24, so that a load is applied to the core inner-circumferential surface portion 36d of the rotor core 22 to force the core inner-circumferential surface portion 36d to expand outwardly in the radial direction. In this instance, a tensile stress is generated in the core curved portion 36c such that the core curved portion 36c is pulled by the generated tensile stress toward the core inner-circumferential surface portion 36d. Further, when the core inclined portion 36b receives a rotational load at the contact point X, a bending load is applied to the key portion 34. In this instance, with the bending load being applied to the key portion 34, a bending stress is applied to the root of the key portion 34. Thus, the tensile load pulling the core curved portion 36c toward the core inner-circumferential surface portion 36d and the bending load applied to the root of the key portion 34 are added to each other, a high stress is applied to the core curved portion 36c, i.e., the root of the key portion 34.

However, the inner circumferential surface between the contact point X of the core inclined portion 36b and the core inner-circumferential surface portion 36d is constituted by the plurality of curved lines having the respective different curvature radii Rc (Rc1-Rc4) and smoothly connected to one another, whereby the applied stress is distributed substantially equally or evenly over the inner circumferential surface of the core curved portion 36c, thereby making it possible to suppress occurrence of stress concentration in the core curved portion 36c.

Further, the straight lines L1, L2, which are extensions of the respective straight lines defining the respective two shaft inclined portions 38b, intersect with each other to define therebetween the first intersection angle θ1, such that the first intersection angle θ1 is set within a range from 30 degrees to 180 degrees. In connection with this, a pair of tangents (corresponding to the straight lines L1, L2), each of which is tangent to the shaft inclined portion 38b of the core inclined portion 36b and passes through the contact point X, also intersect with each other to define therebetween the first intersection angle θ1 that is set within the range from 30 degrees to 180 degrees. With the first intersection angle θ1 being set within the above-described range, the inner circumferential surface of the rotor core 22 between the contact point X of the core inclined portion 36b and the core inner-circumferential surface portion 36d can be defined by a gently curved shape. On the other hand, if the first intersection angle θ1 were smaller than 30 degrees, the core inclined portion 36b would be inclined steeply whereby the curved shape of the inner circumferential surface of the core curved portion 36c would be changed abruptly, so that the stress concentration could be more likely to occur in the core curved portion 36c.

As described above, in the present embodiment, the core bottom portion 36a, the core inclined portion 36b and the core curved portion 36c are contiguous in the circumferential direction and constitute the opposed part of the key portion 34 opposed to the keyway 32, and the core curved portion 36c and the shaft curved portion 38c cooperate to define the clearance S2 therebetween in the radial direction. Thus, the inner circumferential surface of the rotor core 22 between the contact point X (at which the core inclined portion 36b is in contact with the shaft inclined portion 38b) and the core inner-circumferential surface portion 36d can be defined by a gentle curved line or lines. Therefore, even when a high stress is applied to the core curved portion 36c, the applied stress can be distributed substantially equally or evenly over the inner circumferential surface of the rotor core 22 between the contact point X and the core inner-circumferential surface portion 36d, thereby making it possible to suppress occurrence of the stress concentration in the rotor core 22.

In the present embodiment, the inner circumferential surface of the rotor core 22 from the contact point X to the core inner-circumferential surface portion 36d, is defined by the plurality of curved lines having the respective different curvature radii Rc and contiguous to each other, so that the inner circumferential surface of the rotor core 22 between the contact point X and the core inner-circumferential surface portion 36d can be formed to have a gentle curved shape. Therefore, during rotation of the rotor 14, the stress applied to the core curved portion 36c can be distributed substantially equally or evenly over the core curved portion 36c, thereby making it possible to suppress occurrence of the stress concentration in the rotor core 22. Further, the clearance S2 is not larger than 0.5 mm in the radial direction of the rotor 14, so that the inner circumferential surface of the core curved portion 36c can be formed to have a gentle curved shape. Moreover, the pair of tangents (straight lines L1, L2), each tangent to the core inclined portion 36b and passing through the contact point X, intersect with each other and define therebetween the first intersection angle θ1 that is not smaller than 30 degrees and is smaller than 180 degrees. Therefore, the core inclined portion 36b and the core curved portion 36c can be connected through a gentle curved line or lines.

While the preferred embodiment of this invention has been described in detail by reference to the drawings, it is to be understood that the invention may be otherwise embodied.

For example, in the above-described embodiment, the rotor 14 is provided with the two key fitting portions 28 located in the respective positions that are opposite to each other with respect to the rotation axis CL. However, the number of the key fitting portions 28 does not necessarily have to be two, but may be three, four or more.

In the above-described embodiment, the inn inner circumferential surface of the rotor core 22 between the contact point X of the core inclined portion 36b and the core inner-circumferential surface portion 36d is defined by the plurality of curved lines having the respective different curvature radii Rc1-Rc4 and continuously connected to one another. However, the number of the curvature radii Rc of the curved lines defining the inner circumferential surface of the rotor core 22 does not necessarily have to be four. For example, the inner circumferential surface of rotor core 22 may be defined by a plurality of curved lines having five different curvature radii Rc or more and successively connected to one another, as long as the inner circumferential surface of the rotor core 22 is formed smoothly by being defined by the plurality of curved lines having the different curvature radii Rc.

It is to be understood that the embodiment described above is given for illustrative purpose only, and that the present invention may be embodied with various modifications and improvements which may occur to those skilled in the art.

NOMENCLATURE OF ELEMENTS

14: rotor
22: rotor core
24: rotor shaft (shaft)
28: key fitting portion (fitting portion)
32: keyway
34: key portion
36a: core bottom portion
36b: core inclined portion
36c: core curved portion
36d: core inner-circumferential surface portion
38a: shaft bottom portion
38b: shaft inclined portion
38c: shaft curved portion
38d: shaft outer-circumferential surface portion
MG: electric motor
CL: rotation axis
S2: clearance
Rc1-Rc4: curvature radius
$\theta 1$: first intersection angle (intersection angle)

What is claimed is:

1. A rotor for an electric motor, the rotor comprising:
a shaft; and
a tubular rotor core fixed on an outer circumferential surface of the shaft, wherein the shaft includes a keyway provided in the outer circumferential surface, wherein the rotor core includes a key portion provided in an inner circumferential surface thereof and fitted in the keyway, wherein the inner circumferential surface of the rotor core includes:
a core bottom portion defining a top of the key portion;
a core inclined portion inclined from an end portion of the core bottom portion toward an outer periphery of the rotor core;
a core inner-circumferential surface portion; and
a core curved portion connecting between the core inclined portion and the core inner-circumferential surface portion, such that the core bottom portion, the core inclined portion and the core curved portion are contiguous in a circumferential direction of the rotor core and constitute an opposed part of the key portion opposed to the keyway, wherein the outer circumferential surface of the shaft includes:
a shaft bottom portion defining a groove bottom of the keyway;
a shaft inclined portion inclined from an end portion of the shaft bottom portion toward the outer periphery of the rotor core;
a shaft outer-circumferential surface portion; and
a shaft curved portion connecting between the shaft inclined portion and the shaft outer-circumferential surface portion, such that the shaft bottom portion, the shaft inclined portion and the shaft curved portion are contiguous in a circumferential direction of the shaft and constitute an opposed part of the keyway opposed to the key portion,
wherein the core inclined portion of the inner circumferential surface of the rotor core and the shaft inclined portion of the outer circumferential surface of the shaft are in contact at with each other, and
wherein the core curved portion of the inner circumferential surface of the rotor core and the shaft curved portion of the outer circumferential surface of the shaft cooperate to define a clearance therebetween in a radial direction of the rotor.

2. The rotor according to claim 1,
wherein the core inclined portion of the inner circumferential surface of the rotor core and the shaft inclined portion of the outer circumferential surface of the shaft are in contact at a contact portion with each other, and
wherein the inner circumferential surface of the rotor core from the contact portion to the core inner-circumferential surface portion, is defined by a plurality of curved lines having respective different curvature radii and contiguous to each other.

3. The rotor according to claim 1,
wherein the clearance is not larger than 0.5 mm in the radial direction of the rotor.

4. The rotor according to claim 1,
wherein the core inclined portion of the inner circumferential surface of the rotor core and the shaft inclined portion of the outer circumferential surface of the shaft are in contact at a contact portion with each other,
wherein the key portion of the rotor core has a pair of inclined sides that are defined by respective core inclined portions each being the core inclined portion, and
wherein a pair of tangents, each tangent to the core inclined portion and passing through the contact portion, intersect with each other and define therebetween an intersection angle that is not smaller than 30 degrees and is smaller than 180 degrees.

5. The rotor according to claim 1, comprising:
two fitting portions each constituted by the keyway and the key portion that is fitted in the keyway,
wherein the two fitting portions are located in respective positions that are opposite to each other with respect to a rotation axis of the rotor.

6. The rotor according to claim 1,
wherein the shaft outer-circumferential surface portion of the shaft is press-fitted in the core inner-circumferential surface portion of the rotor core.

7. The rotor according to claim 1,
wherein each of the core inner-circumferential surface portion of the inner circumferential surface of the rotor core and the shaft outer-circumferential surface portion of the outer circumferential surface of the shaft is defined by an arc having a curvature center that lies at a rotation axis of the rotor.

* * * * *